MAGNETIC DOMAIN PROPAGATION ARRANGEMENT

Filed May 3, 1968 3 Sheets-Sheet 1

INVENTOR
A. J. PERNESKI
BY Herbert M. Shapiro
ATTORNEY

MAGNETIC DOMAIN PROPAGATION ARRANGEMENT
Filed May 3, 1968 3 Sheets-Sheet 2
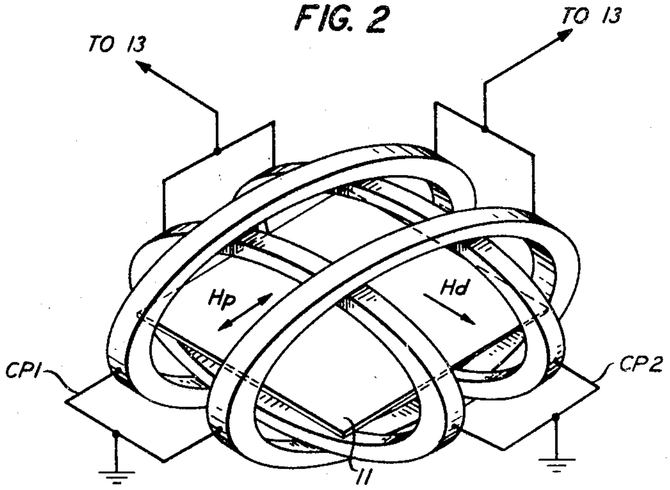
FIG. 3A
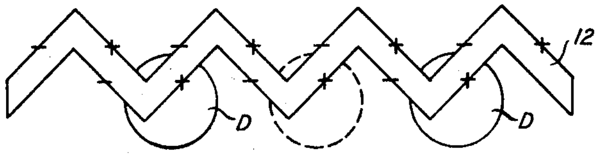
FIG. 5A
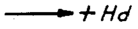
FIG. 3B
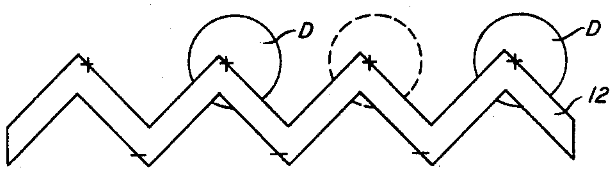
FIG. 5B
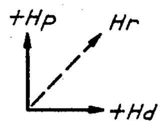
FIG. 3C
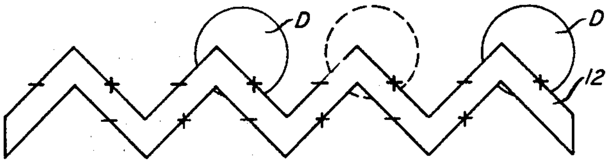
FIG. 5C
FIG. 3D
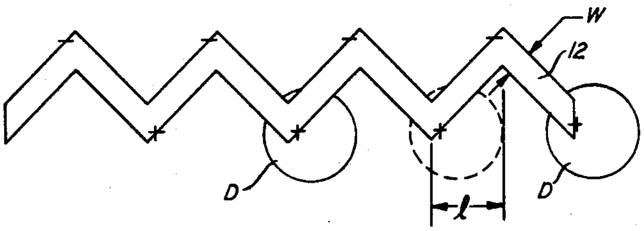
FIG. 5D
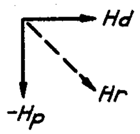

United States Patent Office 3,518,643
Patented June 30, 1970

3,518,643
MAGNETIC DOMAIN PROPAGATION ARRANGEMENT
Anthony J. Perneski, Martinsville, N.J., assignor to Bell Telephone Laboratories, Incorporated, Murray Hill and Berkeley Heights, N.J., a corporation of New York
Filed May 3, 1968, Ser. No. 726,454
Int. Cl. G11c *19/00, 11/16*
U.S. Cl. 340—174 9 Claims

ABSTRACT OF THE DISCLOSURE

The propagation, in a magnetic sheet, of single wall domains of essentially constant diameter is realized in response to magnetic fields rotating in the plane of the sheet. Propagation channels for domains are defined in the sheet by overlays of repetitive geometries in which pole patterns change in response to the rotating field in a manner to attract domains along respective channels. Domains may be moved, in the absence of propagation wiring, in only selected channels by controlling the magnitude of a field in the plane of the sheet in the direction of propagation.

FIELD OF THE INVENTION

This invention relates to magnetic damain propagation devices and, more particularly, to devices in which single wall domains are moved.

BACKGROUND OF THE INVENTION

Single wall domains are magnetic domains, the boundaries of which comprise single domain walls which close on themselves defining, illustratively, a circular cross section having a diameter independent of the boundary of the medium in which the domains are moved. Inasmuch as the boundary of a domain is independent of the boundary of the medium in which the domain is moved, multidimensional movement of the domain is permitted.

The movement of single wall domains along a single axis is much like the movement of a domain having spaced apart leading and trailing edges except for the geometry of the field necessary to move the domain. The movement of domains having spaced apart leading and trailing walls in shift register operation is described in the Bell Laboratories Record, December 1966, at page 364 et seq. The Bell System Technical Journal, vol. 46, No. 8, October 1967, at page 1901 et seq. describes the movement of single wall domains in similar operations.

The last-mentioned article describes materials in which single wall domains can be moved. The materials have, illustratively, preferred axes of magnetization substantially normal to the plane of a sheet of the material. A single wall domain is defined in such a sheet as a localized area in which the magnetization is directed in a "positive" direction along that axis while the surrounding areas of the sheet have the magnetization thereof directed in a "negative" direction along that axis. A single wall domain may be visualized, in this context, as an encircled plus sign.

That article also describes the use of discrete propagation conductor loops consecutivaly offset from the position of a single wall domain for generating localized positive fields when pulsed. The domain is attracted by the consecutive localized fields (viz.: field graduients) and thus can be moved to any selected position in the sheet.

The loop configuration of the propagation conductors, however, limits the packing density realizable in the magnetic sheet. Current requirements necessitate a minimum cross-sectional area to the conductors. Also closely spaced conductors cannot be disproportionately thicker than they are wide without running the risk of short circuits therebetween. So the width of the conductors plus the fact that the loop configuration requires two widths of the conductor plus the spacing therebetween also coupled with the fact that three consecutive loops are often utilized for each bit location to avoid interaction between next adjacent bits, dictate an allocation of about ten mils per bit location regardless of the diameter of the domain moved.

Copending application Ser. No. 710,031 filed Mar. 4, 1968, for A. H. Bobeck and R. F. Fischer describes a domain propagation arrangement in which no propagation conductors are employed. Such an arrangement employs repetitive asymmetrical permalloy patterns on sheets of material in which single wall domains are moved. The patterns define unidirectional channels for domains alternately expanded and contracted in a contigous magnetic sheet. A varying bias field (normal to the plane of the sheet) alternately expands and contracts all domains in the sheet synchronously. This arrangement is particularly well suited for drum or disk type memories but does not permit movement of domains in selected propagation channels.

BRIEF DESCRIPTION OF THE INVENTION

It has been discovered that a single wall domain can be propagated along a channel in a magnetic sheet defined by a contiguous repetitive pattern of, for example, permalloy in response to a field which rotates in the plane of the sheet. The magnetic sheet is characterized, illustratively, by a preferred direction of magnetization normal to the plane of the sheet. Therefore, the rotating field in the plane of the sheet may be characterized as "transverse" with respect to the preferred direction of magnetization. A transverse field, of course, has only negligible effect on the magnetization of a single wall domain at the field strengths contemplated.

In an illustrative embodiment of this invention, single wall domains are moved in a sheet of thulium orthoferrite along zig-zag patterns of permalloy from input to output positions. A bias field of a polarity to contact domains is maintained in the sheet to insure that domains therein retain preferred like diameters. A second D.C. field is maintained in the desired direction of movement in the plane of the sheet. An A.C. field is then generated also in the plane of the sheet but perpendicular to the direction of the second field for providing a rotating or perhaps, more correctly, an oscillating magnetic field.

It has been discovered, further, that the direction and/or magnitude of the second field along with the width of the zig-zag pattern of permalloy determines not only the direction of movement of domains but also permits indiivdual channels to be selected in the absence of propagation conductors.

The invention, then, permits not only a high packing density dependent primarily on the diameter of domains in a magnetic sheet, but also permits a considerable degree of selectivity in the movement of those domains.

A feature of this invention, accordingly, is a domain propagation device including a magnetic sheet in which single wall domains can be moved, a bias field for maintaining a preferred diameter for domains in the sheet, a repetitive magnetic pattern contiguous the sheet for defining propagation channels in the sheet, and means for providing a rotating transverse field in the sheet.

Another feature of this invention is a domain propagation device including a magnetic sheet in which single wall domains can be moved, a bias field for maintaining a preferred diameter for domains in the sheet, spaced apart repetitive magnetic patterns contiguous the sheet for defining propagation channels in the sheet, each of the patterns having different widths, means for providing a rotating transverse field in the sheet, and means for providing in the plane of the sheet a field of a magnitude for selecting a propagation channel for domain movement.

BRIEF DESCRIPTION OF THE DRAWING

FIGS. 2, 3A, 3B, 3C, and 3D show schematic illustrations of portions of the arrangement of FIG. 1;

FIGS. 5A, 5B, 5C, and 5D are representations of the fields generated by the pulses shown in the pulse diagram of FIG. 4.

DETAILED DESCRIPTION

Figure 1:
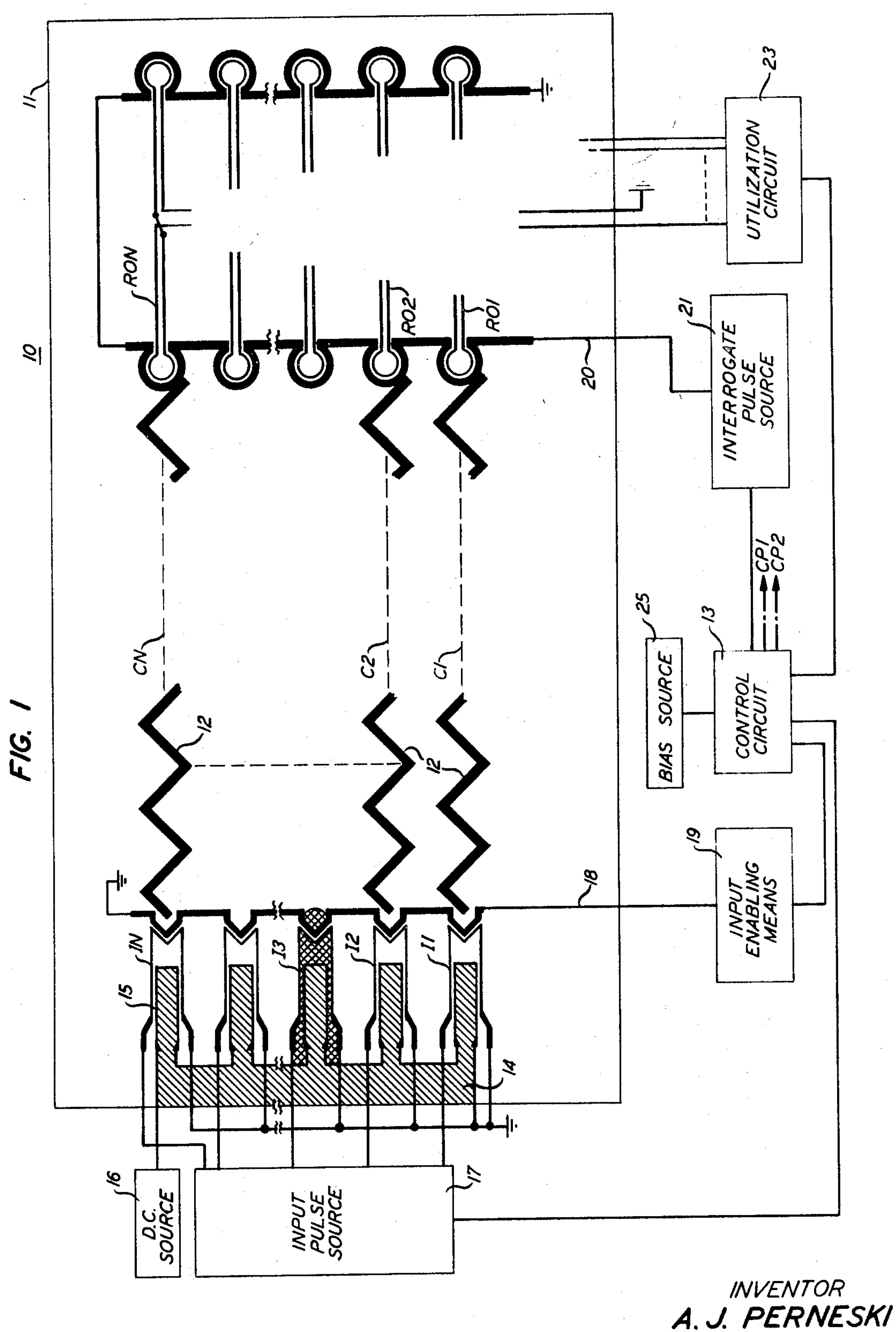
FIG. 1 shows a schematic illustration of a domain propagation arrangement in accordance with this invention.

FIG. 1 shows a domain propagation arrangement 10 in accordance with this invention. The arrangement comprises a sheet of material 11 in which single wall domains can be moved. Single wall domains are introduced selectively to propagation channels in sheet 11 and moved in response to a rotating transverse field from input to output positions associated with each channel.

The arrangement includes a plurality of propagation channels as shown in the figure. The propagation channels are defined in sheet 11 by spaced apart zig-zag patterns 12 of, illustratively, permalloy which extend from input to output positions. The permalloy overlays provide the means by which magnetic poles change positions in response to a rotating field for attracting single wall domains to next consecutive positions in the propagation channels.

The arrangement also includes means providing a rotating transverse field. Two sets of Helmholtz coils are employed to illustrate the means providing the rotating magnetic field. The coils are arranged in pairs, as shown in FIG. 2, to provide uniformity of the field in the permalloy overlays. The pairs of coils are arranged in parallel between ground and control circuit 13 and are activated in the alternative. The two coil pairs are designated CP1 and CP2 as shown in FIG. 2.

FIG. 2 shows a plan view of the coil pairs and sheet 11. It should be clear that when coil pair CP1 is activated, a direction determining field H*d* represented by an arrow so designated is generated in sheet 11 and in the permalloy overlay of FIG. 1. This field may be either positive or negative during operation as is explained further hereinafter. When coil pair CP2 is activated, a propagation field ±H*p* represented by a double-headed arrow so designated is similarly generated. Importantly, the propagation field is both positive and negative during operation. Control circuit 13 is taken to include switching apparatus for activating coil pairs CP1 and CP2 controllably thus providing the fields ±H*d* and ±H*p* as described.

The movement of a domain, in response to a rotating transverse field, along a channel defined by an illustrative zig-zag pattern 12 is shown in FIGS. 3A, 3B, 3C, and 3D. A domain D is shown at an arbitrary position in the channel in FIG. 3A. The domain moves to the position of the closest most highly attracting poles, positive for the domains as visualized. The most highly positive (+) and negative (—) poles are indicated in FIGS. 3A–3D.

Figure 4:
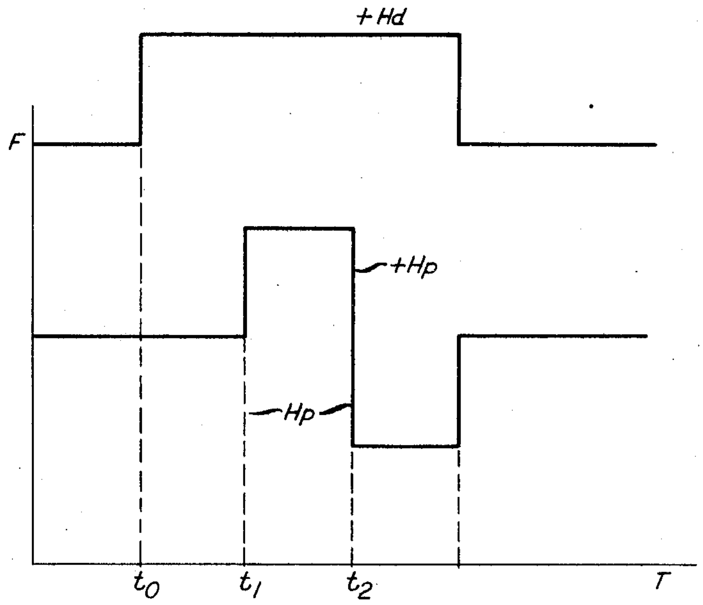
FIG. 4 shows a pulse diagram for operation of the arrangement of FIG. 1.

The poles are generated by the applied fields H*d* and H*p*. The first field +H*d* is generated by activating coils CP1. This is represented by the pulseform +H*d* initiated at time $t_0$ in the pulse diagram of FIG. 4 and by the so-designated arrow in FIG. 5A. A positive field +H*p* is generated at time $t_1$ in FIG. 4 as shown by the arrow so designated in FIG. 5B. The resultant H*r* of fields +H*d* and +H*p* is also shown in FIG. 5B. In response to the field +H*r*, domain D moves to the position shown in FIG. 3B. At a time $t_2$ in FIG. 4, the field +H*p* goes through zero as indicated by the absence of a corresponding arrow in FIG. 5C. The domain moves further to the right slightly as viewed in FIG. 3C. At time $t_2$, however, pulse —H*p* is initiated and, in response, domain D moves to the position shown in FIG. 3D. For each subsequent alternation of the H*p* field, the domain moves to the next adjacent position defined by the repetitive permalloy pattern. In the present embodiment, all domains in sheet 11 moves along their respective channels in response to those alternations. As will become clear hereinafter, this is not necessarily the case.

The domains in sheet 11 may be made to move to the left as viewed in FIG. 3C by reversing the direction of the field H*d*. Again, in response to each alternation of the field H*p*, a domain moves to the next consecutive position defined by the repetitive permalloy pattern. It is now clear that domains may be moved in first or second directions in a propagation channel by a transverse field alternating in direction perpendicular to the direction of movement of the domain. But, those alternations are accompanied by a transverse field in the direction of movement of the domains. The result of the applied transverse fields is a resultant field which rotates through less than 180 degrees generating magnetic poles along the permalloy pattern in a manner to attract the domains for realizing movement in the selected direction. A similar result may be achieved in the absence of a directional field by employing, for example, a magnetometer to provide the rotating field required.

We have now discussed the movement of single wall domains synchronously by the provision of a rotating transverse field in a magnetic sheet.

By a judicious selection of the width of the permalloy overlays, a domain may be made to move along only a selected propagation channel. The selection is made by controlling the amplitude of the transverse field in the direction of movement of the domains. Alternatively, either the direction of movement of a domain or the channel in which movement of a domain is to be effected is controlled by the relative size of the domain. For operation as described, a domain diameter is typically less than twice the width of a leg of the overlay pattern. If the domain diameter exceeds that value, propagation is in the opposite direction. Illustrative implementations for achieving movement of domains along selected channels are discussed at this juncture. Thereafter, illustrative domain input and output implementations are described preparatory to an illustrative operation of the arrangement shown in FIG. 1.

It has been stated hereinbefore that the rotating transverse fields in accordance with this invention establish magnetic pole patterns in the overlay and that those pole patterns change in a manner to attract domains to next consecutive positions in the selected direction of movement. This has been illustrated by the changing patterns of plus and minus signs in FIGS. 3A–3D.

But the strength of the poles for any particular field is a function of the width W of the overlay as shown in FIG. 3D. Thus, by defining the channels C1 . . . CN with overlay patterns having different widths, domains can be made to move along a single one or several or all of the channels so defined by controlling the amplitude of the transverse field ±H*d*.

This selection operation may be illustrated with an example. Let us define *l* as the distance along an axis along which a domain moves in response to one pulse as shown in FIG. 3D. If channel C1 in FIG. 1 is defined by a permalloy pattern having W=about 2.5 mils and *l*=5.0 mils, and channel C2 is defined by permalloy having W=3.3 mils and l=6.7 mils, for H*p*=±25 oersteds, a domain moves selectively along channel C1 for H*d*=39 oersteds while a domain moves selectively along channel C2 for H*d*=22 oersteds. At H*d*=31 oersteds, domains move in both channels synchronously.

Experimentation has indicated considerable flexibility in realizing a selection operation. This is illustrated in Table I where a number of pattern parameters are related to a specfic H*p* and a range of values for H*d*.

TABLE I

| W, | *l*, mils | H*p*, oersteds | H*d*, oersteds |
|---|---|---|---|
| 1.3 | 6.7 | 25 | 5.8–11 |
| 2.5 | 5.0 | 25 | 30–39 |
| 3.3 | 6.7 | 25 | 22–32 |
| 2.66 | 6.7 | 25 | 6.5–20 |

In each instance, a domain oscillates between two adjacent positions for the lower value of H*d* and locks onto a single position for the upper value of H*d*. It is anticipated that a number of channels suitable for telephone repertory dialers (fifty) can be operated selectively in accordance with this invention in the absence of propagation conductors. The thickness of an overlay pattern may also be varied to control pole strength in a similar manner.

We have now demonstrated the propagation operation and the selection of channels in the arrangement of FIG. 1.

Domains are introduced into input positions in the channels of FIG. 1 conveniently by severing a domain from a source of domains. "Ferromagnetic Domains" by E. A. Nesbitt, a Bell Telephone Laboratories publication, 1962, on page 46 (Fig. 40d), shows a large magnetic domain which may be used as a source of domains. The large domain, labeled 14 in FIG. 1, may be made of a shape to provide an extended area associated with each channel. A domain of convenient shape may be provided as shown in Nesbitt and maintained by a conductor 15 of FIG. 1 connected between a D.C. source 16 and ground. An input conductor, I1, I2, . . . and IN, encompasses each extended portion of conductor 15. The input conductors are connected between an input pulse source 17 and ground, and serve to extend the domain 14 into the area defined by each selectively. Source 17 is connected to control circuit 13 to this end. The domain, so extended, occupies the crosshatched area encompassed by conductor I3 in FIG. 1.

It is noted that the input conductors have indented geometries where they most closely approach the permalloy overlays defining the associated channel. A domain, when extended by a pulse in a selected input conductor extends beyond that identation as shown for conductor I3 in FIG. 1.

An enabling conductor 18 mates with the indentation of each input conductor. Conductor 18 is connected between an input enabling means 19 and ground. Any domain extended by a pulse on an input conductor is severed by a pulse on conductor 18 for propagation along the associated channel. At the termination of the input pulse, domain 14 returns to its original shape under the influence of the D.C. current flowing in conductor 15. Means 19 is synchronized conveniently with the activation of coils CP1 for the geometry shown in FIGS. 1 and 2. A domain or binary one is now introduced for propagation. It should be clear, however, that if source 17 does not activate a selected input conductor during a given time slot, a pulse on conductor 18 severs no domain for movement in the associated channel thus storing the absence of a domain or a binary zero. The input arrangement is disclosed in more detail in copending application Ser. No. 705,008, filed Apr. 29, 1968, for A. H. Bobeck, now Pat. No. 3,503,055.

Domain patterns so introduced and propagated, in accordance with this invention, arrive at associated output positions for detection in response to consecutive alternations of the field H*p*. It has been found that a readout coupling of a figure 8 configuration is particularly well suited for detecting the presence of domains in an output position when those domains are collapsed in response to an interrogate pulse. The figure 8 form is consistent with well understood noise cancellation schemes as discussed in copending application Ser. No. 710,031, filed Mar. 1, 1968, for A. H. Bobeck and R. F. Fischer.

The implementation for readout is shown in FIG. 1 in a form suited for photo deposition techniques. The implementation includes an interrogate conductor 20 coupled serially to the "output" positions next adjacent the right extreme of each overlay pattern 12 as viewed in FIG. 1. Conductor 20 also couples serially other positions in sheet 11 which never include domains but are associated with the output positions for constituting the figure 8 arrangement. Conductor 20 is connected between an interrogate pulse source 21 and ground.

Readout conductors RO1, RO2, . . . RON are also coupled to corresponding output positions and to the associated other positions as shown fully in FIG. 1 only for conductor RON. The readout conductors are connected between a utilization circuit 23 and ground.

Source 21 and circuit 23 are connected to control circuit 13 for synchronization.

The various sources and circuits herein may be any such elements capable of operating in accordance with this invention.

The introduction, propagation, and readout of patterns of domains representing binary information have now been described.

A pattern of domains, that is the presence and absence of domains in a channel, represents binary ones and zeros respectively. FIGS. 3A through 3D show the presence of domains represented by a circle and the absence of domains represented by a broken circle. The domain pattern shown thus represents the information 101. The synchronous movement of the information in a representative channel advances the rightmost domain as shown in FIG. 3D to a position which we may take as the output position for the channel. Synchronized interrogate pulses collapse domains under the control of control circuit 13 for detection by utilization circuit 23 via the associated output conductor.

It may be noted from FIGS. 3A through 3D that the domains remain of essentially constant diameter during operation in accordance with this invention. The constant diameter mode of operating with single wall domains implies that the coercive force of sheet 11 is sufficiently low that a bias field of a polarity to contract domains in sheet 11 controls the shape of domains. Such a bias field is applied illustratively normal to sheet 11 and of a negative polarity in accordance with the assumed illustrative operation. A convenient means for applying such a field is a coil (not shown) oriented in the plane of sheet 11. For simplicity in illustration, this field applying means is being represented merely as a block 25 designated "bias source" in FIG. 1.

Figure 6:
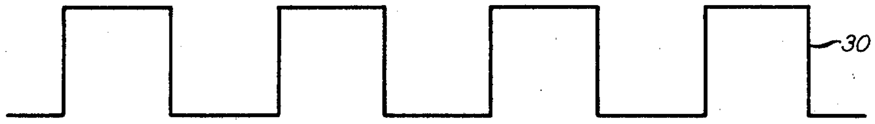
FIG. 6 shows a schematic illustration of a portion of an alternative arrangement in accordance with this invention.

The illustrative embodiment described above includes a zig-zag permalloy overlay. The shape of the overlay as well as the material used therefor is merely illustrative. FIG. 6 shows an alternative overlay pattern 30 of a crenellated form which is well suited for domain movement in response to the rotating resultant field (H*r*) in accordance with this invention. Overlays of the crenellated form may also have different widths and/or thicknesses for permitting selectivity by directional fields of different magnitudes.

Suitable alternative overlay materials are any high permeability thin magnetic film or films having relatively low coercivity and anisotropy so that it can be switched by the external fields characteristic of magnetic domains. Typical materials are magnetically soft permalloy and mumetal, a magnetically soft alloy of copper, nickel, and iron.

What has been described is considered only illustrative of the principles of this invention. Numerous other arrangements in accordance with the principles of this invention may be devised by one skilled in the art without departing from the spirit and scope thereof.

What is claimed is:

1. A domain propagation device comprising a sheet of magnetic material in which single wall domains can be moved, said material having a preferred direction for magnetization substantially normal to the plane of said sheet, means for providing a field substantially normal to the plane of said sheet and of a polarity to contract domains to a preferred diameter, a magnetic layer capable of providing changing pole patterns in response to a rotating transverse field adjacent said sheet for defining a propagation channel for domains in said sheet, and means for generating a rotating magnetic field in the plane of said sheet.

2. A domain propagation device in accordance with claim 1 wherein said means for generating includes means for rotating said magnetic field through less than 180 degrees about first and second directions in said propagation channel selectively.

3. A device in accordance with claim 2 wherein said magnetic layer is pattern to form a plurality of spaced apart repetitive geometries between input and output positions for domains in said sheet, means for introducing domains selectively at said input positions, and means for detecting the presence and absence of domains in said output positions, wherein said means for generating comprises means for selectively generating a first field in the plane of said sheet in first or second directions between input and output positions and means for generating alternating fields in the plane of said sheet but perpendicular to said first field.

4. A device in accordance with claim 3 wherein said magnetic layer comprises spaced apart zig-zag lines of permalloy.

5. A device in accordance with claim 3 wherein said magnetic layer comprises spaced apart crenellated lines of permalloy.

6. A device in accordance with claim 4 wherein said lines have different widths and repeat lengths.

7. A device in accordance with claim 6 also including means for changing the magnitude of said first field.

8. A device in accordance with claim 5 wherein said lines have different widths and repeat lengths.

9. A device in accordance with claim 8 also including means for changing the magnitude of said first field.

References Cited

UNITED STATES PATENTS

| | | | |
|---|---|---|---|
| 3,438,006 | 4/1969 | Spain | 340—174 |
| 3,438,016 | 4/1969 | Spain | 340—174 |

STANLEY M. URYNOWICZ, Jr., Primary Examiner